United States Patent [19]
Phillips

[11] 4,124,226
[45] Nov. 7, 1978

[54] ELECTROHYDRAULIC OUTRIGGER CONTROL SYSTEM

[75] Inventor: Frank T. Phillips, Swisher, Iowa

[73] Assignee: Harnischfeger Corporation, West Milwaukee, Wis.

[21] Appl. No.: 839,800

[22] Filed: Oct. 6, 1977

[51] Int. Cl.² .................................................. B60S 9/10

[52] U.S. Cl. ...................................... 280/765; 180/41; 212/145; 254/86 H; 254/86 R

[58] Field of Search .......................... 212/145; 180/41; 91/459; 280/765; 254/86 H, 86 R

[56] References Cited

U.S. PATENT DOCUMENTS

| | | | |
|---|---|---|---|
| 3,073,458 | 1/1963 | Wieschel | 212/145 |
| 3,550,506 | 12/1970 | Gardenhour | 212/145 |
| 3,603,614 | 6/1968 | Gauchet | 212/145 |
| 3,945,666 | 3/1976 | Fritsch | 212/145 |
| 3,958,813 | 5/1976 | Carey | 212/145 |

*Primary Examiner*—Joseph F. Peters, Jr.
*Assistant Examiner*—Donn McGiehan
*Attorney, Agent, or Firm*—James E. Nilles

[57] ABSTRACT

A mobile crane having four hydraulically operated outrigger assemblies, two on each side, and each having a horizontal extend cylinder and a vertical stabilizer cylinder, includes a electrohydraulic control system whereby any outrigger assembly can be individually extended, retracted, raised or lowered, and whereby two outrigger assemblies on the same side of the crane can either be extended or retracted together or raised or lowered together. The control system comprises eight selector switches (usable individually or in appropriate combinations) for controlling operation of a double solenoid main control valve which conditions the system for extend or retract operation and for controlling operation of four double solenoid cylinder control valves, each of which controls, alternately, one horizontal extend cylinder and one vertical stabilizer cylinder. Each vertical stabilizer cylinder is provided with a lockout valve to prevent drifting.

11 Claims, 7 Drawing Figures

ELECTROHYDRAULIC OUTRIGGER CONTROL SYSTEM

BACKGROUND OF THE INVENTION

1. Field of Use

This invention relates generally to electrohydraulic control systems for the outrigger assemblies of mobile cranes or the like.

2. Description of the Prior Art

Some mobile cranes have four outrigger assemblies, two on each of two opposite sides thereof, and each outrigger assembly includes a horizontal extend cylinder for extending and retracting the outrigger beam and a vertical stabilizer cylinder for raising and lowering the end of the outrigger beam (or a leveling jack attached thereto). A control system is provided for operating the eight cylinders to extend, retract, and lower and raise the outriggers. In some such prior art control systems wherein a total of eight double-acting cylinders need to be controlled, the cylinders are operated individually, or in various combinations. U.S. Pat. Nos. 3,550,506 and 3,603,614 show typical prior art control systems.

In some prior art control systems using double-acting valve circuits, a total of eight solenoid-operated double-acting cylinder control valves are required for controlling fluid flow from a pressurized source for extend and retract purposes, and each such valve employs two solenoid coils, resulting in a total of sixteen coils which need to be controlled.

In other prior art control systems using shut-off valve circuits, with manifolded rod-end cylinder ports, a total of eight solenoid-operated shut-off (on-off) valves and at least one main extend-retract valve are required for controlling fluid flow from the pressurized source. Each shut-off valve employs one solenoid coil and the main valve typically takes the form of a double-acting, six-way, three-position solenoid valve having two solenoid coils thereon. In a shut-off valve circuit, rod-end ports are manifold together (all rod-end cylinder ports are exposed to the same pressure). A double-acting solenoid valve is required to select cylinder "extend" or "retract." Individual cylinder motion is controlled by a solenoid shutoff (two-way, three-position) valve connected to the piston and cylinder port. One shut-off valve is required for each cylinder. Since both ports on the shut-off valve are required to hold pressure, the valving mechanism is a spool rather than the more common (and less expensive) poppet style.

Such prior art systems obviously require considerable redundancy of control valves, solenoid coils, actuator switches, and hose lines. This is costly, both as regards manufacture and maintenance, and increases the chances of breakdown and damage to system components.

SUMMARY OF THE PRESENT INVENTION

In accordance with the invention, a mobile machine, such as a crane, having four hydraulically operated outrigger assemblies, two on each side, and each having a horizontal extend cylinder and a vertical stabilizer cylinder, includes an electrohydraulic control system whereby any outrigger assembly can be individually extended, retracted, raised or lowered, and whereby any combination of horizontal cylinders, from one to four, can be extended or retracted at the same time. The same is true of the vertical cylinders. Any combination of cylinders can be operated simultaneously except the horizontal and vertical cylinders on the same outrigger assembly. The control system comprises eight selector switches (usable individually or in appropriate combinations) for controlling operation of a double solenoid main valve which conditions the system for extend or retract operation and for controlling operation of four double solenoid cylinder control valves, each of which controls, alternately, one horizontal extend cylinder and one vertical stabilizer cylinder. Each vertical stabilizer cylinder is provided with a lockout valve to prevent drifting.

More specifically, the control system enables simultaneous extension or retraction of any combination of horizontal and vertical cylinders except the horizontal and vertical cylinders operating the same outrigger assembly. The main valve is a double solenoid operated (extend and retract solenoids) four-way three-position (neutral, extend, retract) valve for conditioning the system for extend or retract operation. Each cylinder control valve is a double solenoid operated four-way three position valve. Each cylinder control valve controls, alternately, one horizontal extend cylinder and one vertical stabilizer cylinder, but only one of these two cylinders can be operated (extended or retracted) at a given time. Each of the two solenoids on each cylinder control valve controls both the extend and retract operations of its associated cylinder. The same solenoid on any given one of the four solenoid valves operates, when energized, to extend or retract the cylinder (horizontal extend or vertical stablilizer) associated therewith. The eight selector switches are mounted on a control panel and each selector switch is a double pole double throw three-position (neutral, extend, retract) toggle switch. The eight selector switches are usable individually or in appropriate combinations, and each switch controls operation of either one of the solenoids of said main control valve and one solenoid of one cylinder control valve.

In operation, the main valve is connected to supply pressurized fluid to all of the cylinder control valves, when the main valve is in extend position. The main valve is also connected to supply pressurized fluid to all cylinders, when the main valve is in retract position. Each cylinder control valve is connected to supply pressurized fluid to a cylinder, when that cylinder control valve is actuated.

To extend the horizontal extend cylinders, the main valve is energized to the extend position and any combination of the four horizontal extend cylinders are extended by energizing the horizontal cylinder control solenoids therefor. When the desired horizontal position is reached, any combination of the four vertical stabilizer cylinders, as the case may be, can be extended by energizing the vertical stabilizer cylinder control solenoids therefor. It is possible to extend or retract combinations of horizontal and vertical cylinders as long as they are not part of the same outrigger beam assembly.

The single solenoid valve which controls a jack cylinder and a horizontal extend cylinder will operate one or the other cylinder in an assembly, but not both simultaneously.

To retract, the main valve is shifted to the retract mode which will pressurize the rod ends of all the cylinders. A cylinder is then retracted by energizing the same solenoid that was initially energized to extend that particular cylinder.

It is to be understood that in all operations, one solenoid of the main valve and one solenoid on the control valve selected for operation are energized simultaneously by operation of a selector switch.

The control system in accordance with the invention has many advantages over prior art systems. For example, it employs a total of only five valves and ten solenoids, instead of the eight or nine valves and ten to sixteen solenoids required in some of the prior art systems. Also, since the main valve conditions the system for extend or retract operation, the same solenoid coil of a cylinder control valve is employed for extend or retract operation of the cylinder control valve and this provides the advantages of metering fluid into and out of the cylinder. Furthermore, the lockout valves prevent the cylinders from drifting and, because the cylinder ports of the valves are connected to tank, the valve leakage is vented to tank.

The use of the double solenoid also provides a means of manually shifting the valve spool if a hang-up occurs due to contamination. With a solenoid shut-off valve, a manual shift is in the same direction a valve spool would move during a malfunction and, therefore, leave no means of returning the spool to the relaxed position.

The proposed five-valve outrigger control circuit differs from control circuits currently in use primarily in the valve arrangement, which reduces valve and solenoid components by 30 to 40 percent with little reduction in operating flexibility.

Other objects and advantages of the invention will hereinafter appear.

DESCRIPTION OF A PREFERRED EMBODIMENT

Figure 1:
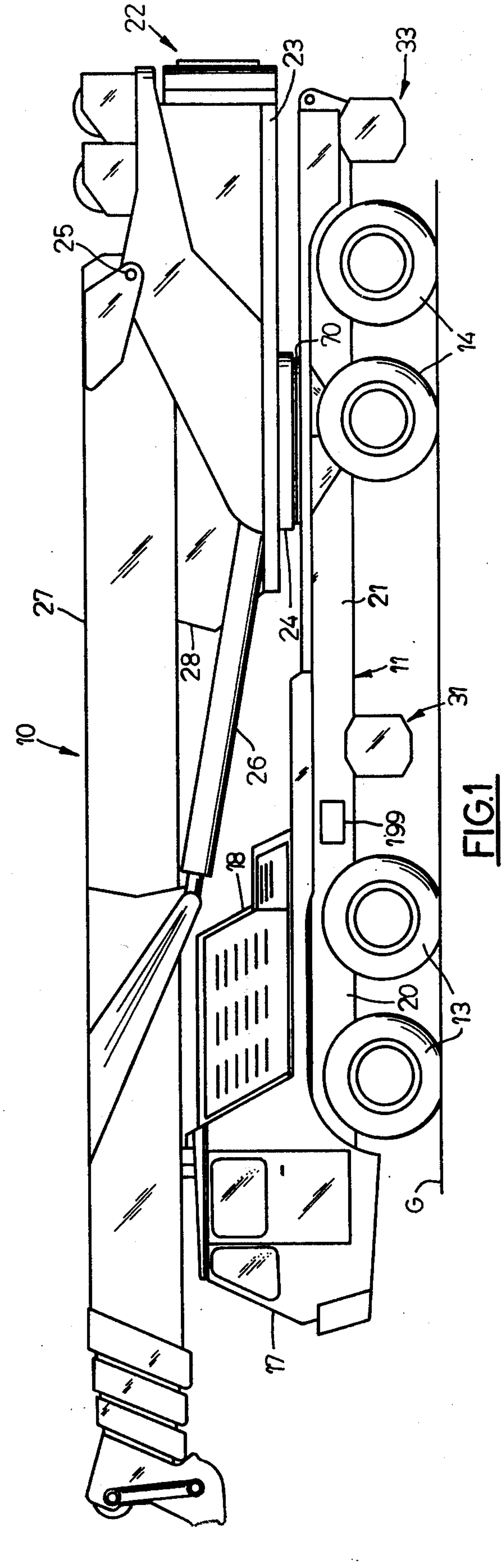
FIG. 1 is a side elevational view of a mobile crane having an outrigger control system in accordance with the invention.
Figure 3:
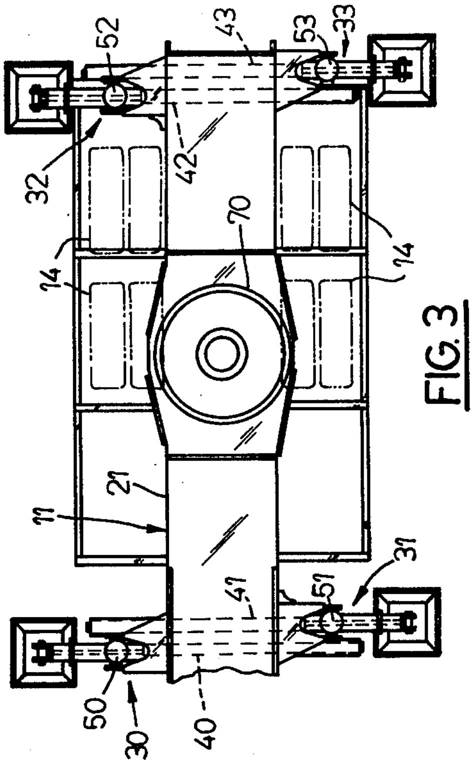
FIG. 3 is a top plan view in reduced scale of a portion of the carrier frame of the crane shown in FIGS. 1 and 2, with portions broken away, and showing the outriggers partially deployed.
Figure 2:
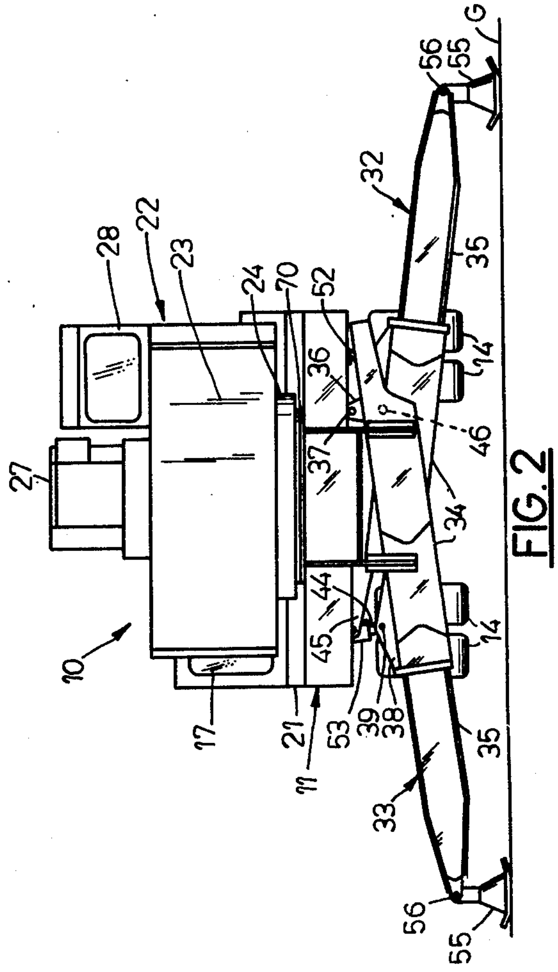
FIG. 2 is an end elevational view of the crane of FIG. 1 showing it with its outriggers fully deployed.

Referring to FIGS. 1, 2, and 3, there is shown a mobile crane 10 having outriggers and an electrohydraulic outrigger control system in accordance with the present invention. Crane 10 has a carrier frame 11 which generally comprises a forward section 20 and a rear or principal load-bearing section 21. Carrier frame 11 has a set of forward and rear ground-engaging wheels 13 and 14, respectively, which are mounted thereon. A driver's cab 17 and an engine enclosure 18 are mounted at the front end of the carrier frame 11. A conventional crane upper 22 is mounted near the center of load-bearing section 21 of the carrier frame 11. Crane upper 22 includes a framework 23 which is supported on carrier frame 11 for horizontal rotation by a conventional slew ring assembly 24, including a bearing ring 70. Crane upper 22 also includes a telescopic boom 27 which is pivotable in a vertical plane about a point 25 by means of a boom cylinder 26 connected between the framework 23 and the boom 27. Crane upper 22 is also provided with a crane operator's cab 28.

Forward outriggers 30, 31 and rear outriggers 32, 33 are mounted at the right and left front and the right and left rear ends, respectively, of load-bearing section 21 of carrier frame 11. FIG. 1 shows mobile crane 10 in its road transport condition wherein its wheels engage the ground G. FIG. 2 shows mobile crane 10 in an operative position wherein all four outriggers 30, 31, 32, and 33 are fully deployed and the mobile crane is raised and fully supported by the outriggers.

Figures 6, 7:
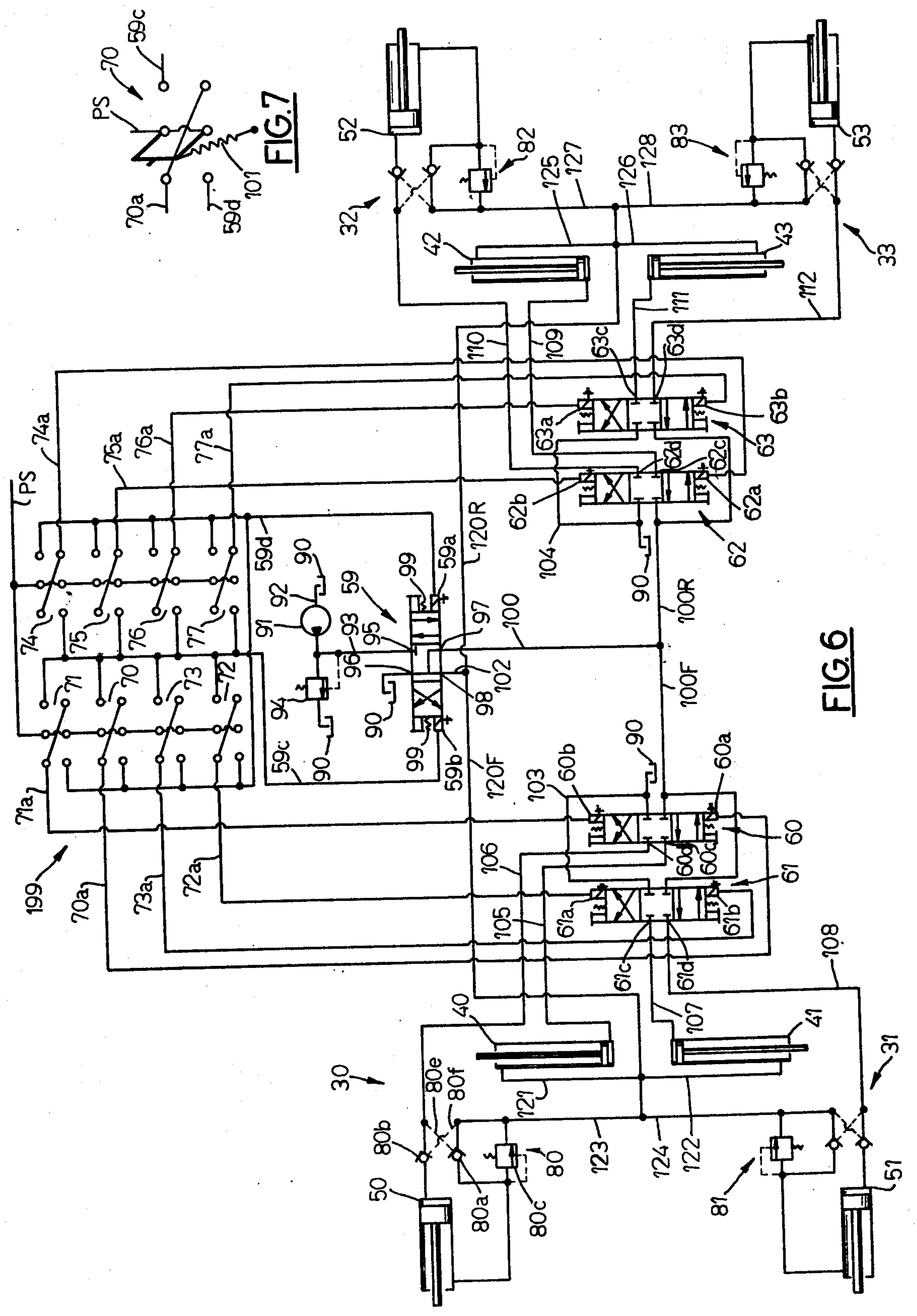
FIG. 6 is a schematic diagram of the electrohydraulic outrigger control system in accordance with the present invention.
FIG. 7 is an enlarged schematic view showing one of the eight toggle switches shown in FIG. 6.

The outriggers 30, 31, 32, and 33 may, for example, take the form of those shown in U.S. Pat. No. 3,945,666, which is assigned to the same assignee as the present application. As FIGS. 2 and 3 show, each outrigger 30, 31, 32, and 33 includes an outrigger beam 34 which pivotally secured to carrier frame 11. Each outrigger beam 34 extends across the bottom of the frame 11 and has one end pivotally connected to a side of the frame opposite its direction of extension. When deployed in their outward and downward position, the outrigger beams 34 assume a criss-cross configuration as shown in FIG. 2. Each outrigger beam 34 is associated with a telescopically related inner beam section 35 which is extendable and rectractable within the outer beam section. Both outrigger beam 34 and beam section 35 have a hollow rectangular cross-section configuration and house a hydraulic cylinder for extending and retracting the inner beam section 35. As FIGS. 3 and 6 show, the outriggers 30, 31, 32, and 33 have the hydraulic motors or fluid pressure operated extendable and retractable horizontal extend cylinders 40, 41, 42, and 43, respectively, associated therewith. Each outrigger beam 34 is attached at one end to the frame 11 by a pivot bracket 36 extending downwardly from the frame and is swingable on a pivot pin 37. At its opposite end, the outrigger beam 34 is embraced by a yoke 38 which is, in turn, pivotally connected by a pin 39 to a piston rod 44 of a hydraulic motor which is supported on frame 11 by a trunnion 45. As FIGS. 3 and 6 show, the outriggers 30, 31, 32, and 33 have vertical stabilizer cylinders 50, 51, 52, and 53, respectively, associated therewith.

Telescopic movement is imparted to the inner beam sections 35 of the outriggers 30, 31, 32, 33 by the horizontal extend cylinders 40, 41, 42, 43 which are located therewithin and which are pivotally connected to one end to the outer beam 34 by a pin 46. Vertical movement is imparted by the vertical stabilizer cylinders 50, 51, 52, and 53. All of the hydraulic motors 40–43 and 50–53 are double-acting and actuated by a hydraulic control system shown in FIG. 6.

Each telescopic inner beam section 35 has at its end a ground-engaging foot 55 which is pivotally attached by a pivot pin 56 so as to be able to swing downwardly as shown in FIG. 2 when the inner beam section 35 is extended.

In accordance with the present invention, as FIG. 6 shows, crane 10 has the right front, left front, right rear, and left rear outriggers 30, 31, 32, and 33, respectively. Outriggers 30, 31, 32, and 33 include the horizontal extend cylinders 40, 41, 42, and 43, respectively, and the vertical stabilizer cylinders 50, 51, 52, and 53, respectively. The electrohydraulic control system for operating the eight cylinders includes a single four-way three-position double solenoid operated main valve 59 having a pair of solenoids 59*a* and 59*b* energizable for conditioning the system for extend or retract operations, and four three-position double solenoid operated cylinder control valves 60, 61, 62, and 63, each having a pair of solenoids designated by the suffix letters *a* or *b* and each operating, alternately, a horizontal extend cylinder and a vertical stabilizer cylinder as hereinafter explained. The control system also comprises eight panel-mounted three-position double pole double throw selector switches 70 through 77 (shown in FIGS. 6, 7, and 8) for operating the solenoids on main valve 59 and on valves 60 through 63. Four lockout valves 80, 81, 82, and 83 are provided for the vertical stabilizer cylinders 50 through 53 to prevent drifting. When both solenoids of any valve 59, 60, 61, 62, 63 are deenergized, the valve remains in or returns to neutral. Actuation of any one of the eight selector switches 70–77 from neutral to either of its operative positions operates the main solenoid valve 59 to extend or retract condition and simultaneously operates the appropriate one of the solenoids *a* or *b* for the selected valve 60, 61, 62, or 63 and effects operation of a selected horizontal cylinder 40, 41, 42, 43 or a vertical cylinder 50, 51, 52, 53, as hereinafter explained. The system contemplates simultaneous activation of any combination of toggle switches at a given time, namely, any toggle switch 70, 71, 72, 73 controlling a front cylinder in combination with a corresponding toggle switch 74, 75, 76, 77 controlling a rear cylinder so as to enable simultaneous extension or retraction of the front and rear horizontal extend cylinders (any combination of 40, 41, 42, and 43) or simultaneous extension or retraction of the front and rear vertical stabilizer cylinders (any combination of 50, 51, 52, 53). The system also contemplates independent operation of any one of the cylinders 40, 41, 42, 43, 50, 51, 52, or 53 at any time. The same solenoid is energized on any given one of the four valves 60, 61, 62, 63 to extend or retract a cylinder controlled by that solenoid.

Referring to FIG. 6, the hydraulic circuitry of the control system comprises a suitable fluid source or reservoir 90 supplying a pump 91 through a line 92. An output line 93 from the pump 91 is connected to main valve 59 and has a pressure relief valve 94 connected thereto which discharges to reservoir 90. Main valve 59 is a solenoid operated three-position four-way valve of the spool type and is spring-loaded by springs 99 to a normal neutral position, as shown in FIG. 6. Main valve 59 comprises two solenoids 59*a* and 59*b* which, when deenergized, allow the valve 59 to remain in or return to neutral. Energization of solenoid 59*a* or 59*b* causes main valve 59 to assume the extend or retract position, respectively.

Main valve 59 has an inlet port 95 connected to line 93, an outlet port 96 connected to reservoir 90 and an extend port 97 and a retract port 98, either of which is pressurizable depending on valve position, for connection to extend line 100 and retract line 102, either of which serves as a fluid supply line or fluid return line, depending on valve position. Extend line 100 connects to branch lines 100F and 100R. Branch line 100F connects to the inlet/exhaust ports of cylinder control valves 60 and 61. Branch line 100R connects to the inlet/exhaust ports of cylinder control valves 62 and 63. The reservoir ports of the valves 60, 61 and 62, 63 are connected by lines 103 and 104, respectively, to reservoir 90. The port 60*c* and 60*d* of valve 60 is connected by lines 105 and 106, to the extend chambers of the cylinders 40 and 50, respectively. The ports 61*c* and 61*d* of valve 61 are connected by lines 107 and 108 to the extend chambers of the cylinders 41 and 51, respectively. The ports 62*c* and 62*d* of valve 62 are connected by lines 109 and 110 to the extend chambers of the cylinders 42 and 52, respectively. The ports 63*c* and 63*d* of valve 63 are connected by lines 111 and 112 to the extend chambers of the cylinders 43 and 53, respectively. The main line 102, hereinbefore referred to, connected to port 98 of main valve 59 is connected to branch lines 120F and 120R. Branch line 120F is connected by branch lines 121 and 122 to the retract chambers of the horizontal extend cylinders 40 and 41, respectively. Branch line 120F is also connected by branch lines 123 and 124 to the retract chambers of the vertical cylinders 50 and 51, respectively. Branch line 120R is connected by branch lines 125 and 126 to the retract chamber of the horizontal extend cylinders 42 and 43, respectively. Branch line 120 R is also connected by branch lines 127 and 128 to the retract chambers of the vertical cylinders 52 and 53, respectively.

The lockout valve 80 for vertical cylinder 50 will now be described in detail and it is to be understood that it is similar in construction, connection and mode of operation to the other lockout valves 81, 82, and 83. Lockout valve 80 comprises a check valve 80*a* which is located in line 123 and poled to permit fluid flow into the retract chamber of vertical cylinder 50. Valve 80 further comprises a check valve 80*b* which is located in line 106 and poled to permit fluid flow into the extend chamber of vertical cylinder 50. A normally closed thermal relief valve 80*c* is connected in parallel or across check valve 80*a*. The check valves 80*a* and 80*b* are cross-connected by pilot fluid lines 80*e* and 80*f* to the lines 106 and 123, respectively. In operation, when main valve 59 and cylinder control valve 60 are both in neutral and neither line 106 nor line 123 is pressurized, the check valves 80*a* and 80*b* operate to prevent fluid flow from either the retract or extend chambers of cylinder 50. However, if main valve 59 and cylinder control valve 60 are operated to pressurize line 106, check valve 80*b* opens to permit fluid flow into the extend chamber of cylinder 50 and pilot fluid flow in pilot fluid line 80*e* causes check valve 80*a* to open, thereby allowing fluid to be exhausted through check valve 80*a* from the retract chamber of cylinder 50. Similarly, if main valve 59 and cylinder control valve 60 are operated to pressurize line 123, check valve 80*a* opens to permit fluid flow into the retract chamber of cylinder 50 and pilot fluid flow in pilot fluid line 80*f* causes check valve 80*b* to open, thereby allowing fluid to be exhausted through check valve 80*b* from the extend chamber of cylinder 50.

Figure 4:
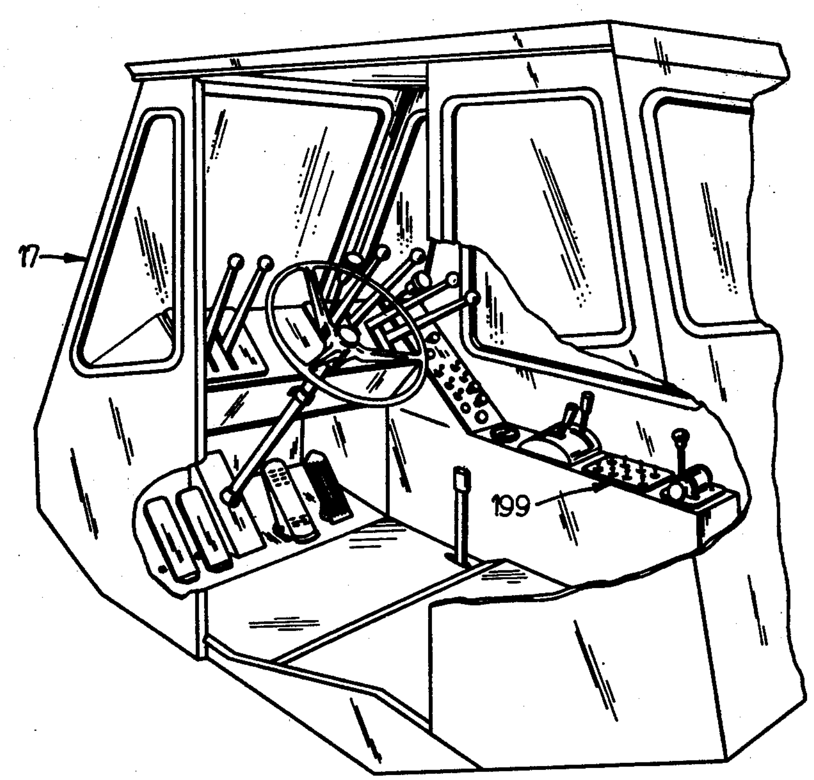
FIG. 4 is an enlarged perspective view of the interior of the driver's cab of the mobile crane shown in FIG. 1 and depicting the control console for the outriggers.
Figure 5:
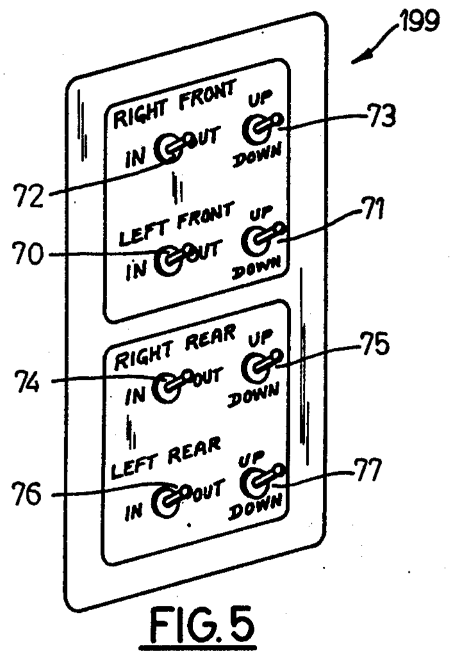
FIG. 5 is an enlarged perspective view of the console shown in FIG. 4.

As FIGS. 4, 5, and 6 show, the eight selector switches 70–77 are mounted on a panel 199, which panel is located in the driver's cab 17. In an actual embodiment of the invention, it is preferable that one or more duplicate control panels such as 199 be located on the exterior of the crane 10 such as on the carrier frame side, so that the machine operator can observe the outriggers as they are extended. However, for purposes of simplification, duplicate control panels are not shown. As FIG. 7 shows, each selector switch 70–77 is a double pole double throw three-position switch which is normally spring biased as by springs 101 in neutral position and which is movable in one direction to effect extension of the particular cylinder which it controls and movable in the opposite direction to effect retraction of the particular cylinder it controls. However, it is to be understood that when each selector switch 70–77 is moved from neutral to either of its two other positions, it still effects energization of the same solenoid on the particular cylinder control valve with which it is associated. In other words, the effect of moving a selector switch from neutral to either of its actuating positions is to effect energization of one or the other of the solenoids **59*a* or 59*b* of the main valve 59, thereby conditioning the system for either extend or retract operations. As FIG. 6 shows, each of the solenoids on the main valve 59 and the cylinder control valves 60, 61, 62, 63 has one side grounded and its other side electrically connected by a conductor wire to the selector switches. More specifically, the switches 70, 71, 72, and 73 are electrically connected by the conductor wires 70*a*, 71*a*, 72*a*, 73*a* to the solenoids 60*a*, 60*b*, 61*a*, 61*b*, respectively. The switches 74, 75, 76, 77 are connected by the conductor wires 74*a*, 75*a*, 76*a*, 77*a* to the solenoids 62*a*, 62*b*, 63*a*, 63*b*, respectively. Furthermore, each of the switches 70–77 is connectable through a conductor wire 59*c* to energize solenoid 59*b* of main valve 59. Each of the switches is also connectable through a conductor 59*d* to energize solenoid 59*a* of main valve 59**. The selector switches operate to connect the appropriate solenoids to a power source designated PS in FIG. 6.

As FIG. 5 shows, switch 70 controls in-out (retraction-extension) of horizontal extend cylinder 40 of the right front outrigger 30. As FIG. 5 shows, switch 71 controls in-out (retraction-extension) of vertical extend cylinder 50 of the right front outrigger 30. As FIG. 5 shows, switch 72 controls in-out (retraction-extension) of horizontal extend cylinder 41 of the right front outrigger 31. As FIG. 5 shows, switch 73 controls in-out (retraction-extension) of vertical extend cylinder 51 of the right front outrigger 31. As FIG. 5 shows, switch 74 controls in-out (retraction-extension) of horizontal extend cylinder 42 of the right front outrigger 32. As FIG. 5 shows, switch 75 controls in-out (retraction-extension) of vertical extend cylinder 52 of the right front outrigger 32. As FIG. 5 shows, switch 76 controls in-out (retraction-extension) of horizontal extend cylinder 43 of the right front outrigger 33. As FIG. 5 shows, switch 77 controls in-out (retraction-extension) of vertical extend cylinder 53 of the right front outrigger 33.

OPERATION

An outrigger control system in accordance with the present invention operates as follows. Assume that all operable system components are in a condition shown in FIG. 6, that the four outriggers are fully retracted, and that it's desired to fully deploy all four outriggers.

It is to be understood that each of the outriggers 30, 31, 32, 33 could be deployed individually by operating the selector switches in the following sequence: Operation of the switches 70, 72, 74 and 76 in any sequence in the "out" direction to effect full or partial extension of the horizontal extend cylinders 40, 41, 42, 43. This is then followed by operation of the switches 71, 73, 75, 77 in any sequence in the down position to effect extension of the vertical stabilizer cylinders 50, 51, 52, 53. It is to be understood, however, that such individual deployment is relatively time-consuming and hot desirable unless it is necessary to effect individualized location or adjustment of a specific outrigger.

The preferred procedure for effecting full deployment of all outriggers is to effect extension of both outriggers on one side of the crane simultaneously, or both front outriggers, or both rear outriggers, any three outriggers or all four outriggers if desired. Any or all of the vertical outrigger cylinders can be extended or retracted in a like manner.

To facilitate understanding of the relationship between the outriggers, cylinders, control valves, solenoids and selector switches, the following table is presented wherein the afore-listed components are identified numerically. Thus, in the following table, for example, selector switch 70 controls solenoid **60*a* of control valve 60 which in turn controls operation of cylinder 40 of outrigger 30. It is to be further understood in connection with the following table that actuation of switch 70 from neutral to the out position energizes the extend solenoid 50*a* of main valve 59, as well as operating solenoid 60*a*. This results in extension of cylinder 40. Conversely, actuation of switch 70 in the retract direction effects energization of retract solenoid 59*b* of main valve 59 with the result that concurrent energization of solenoid 60*a* of control valve 60 enables retraction of cylinder 40. For example, with the main valve 59 in extend position and control valve 60 in extend position (solenoids 59*a* and 60*a* both energized), fluid flows from pump 91 through line 93, through valve 59, through line 100, through line 100F, through valve 60, through line 105, into the extend chamber of cylinder 40. At the same time, fluid expelled from the retract chamber of cylinder 40 flows through line 121, through line 120F, through valve 59, to reservoir 90. It is to be understood that all cylinders operate in a similar manner, taking into account that the operation of the lockout valves 80, 81, 82, 83 for the cylinders 50, 51, 52, 53, respectively, as hereinbefore explained in connection with lockout valve 80**.

| Outrigger | Cylinder | Control Valve | Solenoid | Switch | Main Valve | Cylinder Condition |
|---|---|---|---|---|---|---|
| 30 | 40H | 60 | 60a | 70 | Extend | 40 Extend |
| | | | | | Retract | 40 Retract |
| 30 | 50V | 60 | 60b | 71 | Extend | 50 Extend |
| | | | | | Retract | 50 Retract |
| 31 | 41H | 61 | 61a | 72 | Extend | 41 Extend |
| | | | | | Retract | 41 Retract |
| 31 | 51V | 61 | 61b | 73 | Extend | 51 Extend |
| | | | | | Retract | 51 Retract |
| 32 | 42H | 62 | 62a | 74 | Extend | 42 Extend |
| | | | | | Retract | 42 Retract |
| 32 | 52V | 62 | 62b | 75 | Extend | 52 Extend |
| | | | | | Retract | 52 Retract |
| 33 | 43H | 63 | 63a | 76 | Extend | 43 Extend |
| | | | | | Retract | 43 Retract |
| 33 | 53V | 63 | 63b | 77 | Extend | 53 Extend |
| | | | | | Retract | 53 REtract |

As is apparent from the foregoing, the outrigger assemblies 30, 31, 32, 33 on crane 10 are controlled electrically either from each side of the carrier 11 or from the cab 17 by control panels, such as 199, on each side of the carrier and in the cab. To extend the outriggers from a control panel such as 199, it is preferable to proceed as follows. Extend the outrigger extend cylinders 40, 42 or 41, 43 by placing the desired horizontal extend switches in the OUT position. Lower the outrigger vertical stabilizer cylinders 50, 52, or 51, 53, to raise the machine off the ground by placing the desired vertical stabilizer switches in the DOWN position. After all four outriggers 30–33 have been extended and lowered, make the necessary leveling adjustments by raising or lowering each outrigger vertical stabilizer cylinders 50–53 as required until the crane 10 is level. To retract the outriggers, proceed as follows. Raise the outrigger vertical stabilizer cylinders by placing the desired vertical stabilizer switches in the UP position. Retract all vertical cylinders before retracting any horizontal cylinders. Retract the outriggers by placing the appropriate horizontal extend switches in the IN position.

I clam:

1. In a mobile machine:

four hydraulically operated outrigger assemblies, with two outrigger assemblies on each of two opposite sides of said machine, each outrigger assembly having an extendable and retractable horizontal extend cylinder and an extendable and retractable vertical stabilizer cylinder;

a source of pressurized hydraulic fluid for operating said cylinders;

and an electrohydraulic control system for supplying fluid from said source to operate said cylinders and comprising:

a solenoid operated main valve;

four solenoid operated cylinder control valves;

and eight selector switches, each selector switch being operable individually to effect operation of said main valve and one of said cylinder control valves to effect extension or, alternately, retraction of the horizontal extend cylinder or alternately, the vertical stabilizer cylinder in one of said outrigger assemblies, selected ones of said selector switches being operable in combination to effect simultaneous extension or, alternately, retraction of the horizontal extend cylinders or, alternately, the vertical stabilizer cylinders on the machine.

2. In a mobile machine:

four hydraulically operated outrigger assemblies, with two outrigger assemblies on each of two opposite sides of said machine, each outrigger assembly having an extendable and retractable horizontal extend cylinder and an extendable and retractable vertical stabilizer cylinder;

a source of pressurized hydraulic fluid for operating said cylinders;

and an electrohydraulic control system for supplying fluid from said source to operate said cylinders and comprising:

a solenoid operated main valve;

four solenoid operated cylinder control valves;

and eight selector switches, each selector switch having one position wherein it operates said main valve to supply pressurized fluid from said source to said cylinder control valves and wherein it operates a cylinder control valve to supply fluid from said cylinder control valve to one of said horizontal extend cylinders or to one of said vertical stabilizer cylinders to operate a cylinder in one direction, each selector switch having another position wherein it operates said main valve to supply pressurized fluid from said source to said cylinders and wherein it operates a cylinder control valve to exhaust fluid from one of said horizontal extend cylinders or from one of said vertical stabilizer cylinders to operate a cylinder in a direction opposite to said one direction.

3. A machine according to claim 2 wherein said main valve is a double-solenoid operated main valve and wherein each of said cylinder control valves is a double-solenoid operated cylinder control valve.

4. A machine according to claim 3 wherein said cylinders are double-acting cylinders.

5. A machine according to claim 4 wherein each of said selector switches has a neutral position in addition to its said one position and said other position.

6. In a mobile machine:

four hydraulically operated outrigger assemblies, with two outrigger assemblies on each of two opposite sides of said machine, each outrigger assembly having an extendable and retractable double-acting horizontal extend cylinder and an extendable and retractable double-acting vertical stabilizer cylinder;

a source of pressurized hydraulic fluid for operating said cylinders;

and an electrohydraulic control system for supplying fluid from said source to operate said cylinders and comprising:

a double solenoid operated main valve having an extend position and a retract position;

four double solenoid operated cylinder control valves, each cylinder control having two operating positions;

and eight selector switches, each selector switch having an extend position wherein it operates said main valve to extend position to supply pressurized fluid from said source to said cylinder control valves and wherein it operates a cylinder control valve to one operating position to supply fluid from said cylinder control valve to one of said horizontal extend cylinders or, alternately, to one of said vertical stabilizer cylinders to operate a cylinder in the extend direction, each selector switch having a retract position wherein it operates said main valve to retract position to supply pressurized fluid from said source to said cylinders and wherein it operates a cylinder control valve to another operating position to exhaust fluid from one of said horizontal extend cylinders or, alternately, from one of said vertical stabilizer cylinders to operate a cylinder in the retract direction.

7. In mobile equipment:

four outrigger assemblies including right front and rear and left front and rear outrigger assemblies, each assembly including a horizontal extend cylinder and a vertical stabilizer cylinder;

a main valve having an extend solenoid and a retract solenoid;

four cylinder control valves, each cylinder control valve having a horizontal extend cylinder control solenoid and a vertical stabilizer control solenoid thereon;

fluid conduit means for connecting said main valve to said four cylinder control valves, for connecting said main valve to said cylinder, and for connecting each of said cylinder control valves to one horizontal extend cylinder and to one vertical stabilizer cylinder;

and a plurality of selector switches for operating said solenoids, each selector switch being operable in one position to effect operation of one solenoid of said main valve and one solenoid of one cylinder control valve, and being operable in another position to effect operation of the other solenoid of said main valve and said one solenoid of said one cylinder control valve, each selector switch being operable independently to effect, alternately, extension or retraction of its associated cylinder, and predetermined combinations of selector switches being operable simultaneously to effect, alternately, extension and retraction of a corresponding combination of outrigger assemblies and to effect, alternately, extension and retraction of a combination of vertical stabilizer cylinders.

8. In a mobile machine:

four hydraulically operated outrigger assemblies, two on each side of said machine, each outrigger assembly having a horizontal extend cylinder and a vertical stabilizer cylinder;

and an electrohydraulic control system for operating said cylinders comprising:

a source of pressurized hydraulic fluid;

a double solenoid operated main valve;

four double solenoid operated cylinder control valves;

a source of electric power for energizing the solenoids;

conduit means for connecting said main valve to supply fluid from said source of fluid to said cylinder control valves and to said cylinders;

conduit means for connecting each cylinder control valve to one horizontal extend cylinder and to one vertical stabilizer cylinder;

and eight selector switches for operating said solenoids, each selector switch having one position wherein it operates one solenoid of said main valve and one solenoid of one cylinder control valve, each selector switch having another position wherein it operates the other solenoid of said main valve and said one solenoid of said one cylinder control valve, each selector switch being operable independently to effect, alternately, extension or retraction of its associated cylinder, and predetermined pairs of selector switches being operable simultaneously to effect, alternately, extension and retraction of the pair of horizontl extend cylinders for one side of said machine, and to effect, alternately, extension and retraction of the pair of vertical stabilizer cylinders on one side of said machine.

9. In a mobile machine:

two pairs of outrigger assemblies, one pair on each of two opposite sides of said machine, each outrigger comprising an extendable and retractable extend cylinder and an extendable and retractable vertical stabilizer cylinder;

and an electrohydraulic control system for operating said cylinders and comprising:

a source of pressurized hydraulic fluid;

a main valve having extend and retract solenoids for placing said main valve in extend and retract positions, respectively;

four cylinder control valves, each control valve having an extend cylinder control solenoid and a vertical stabilizer control solenoid for connecting its associated control valve to supply fluid to the extend chamber of said extend cylinder and to the extend chamber of said vertical stabilizer cylinder, respectively, and for connecting its associated control valve to exhaust fluid from the extend chamber of said vertical stabilizer cylinder and to exhaust fluid from the extend chamber of said extend cylinder, respectively;

conduit means for connecting said main valve to supply fluid from said source to said four cylinder control valves when said main valve is in its extend position;

conduit means for connecting said main valve to supply fluid from said source to the retract chamber of all eight cylinders when said main control valve is in its retract position;

and eight selector switches for controlling said solenoids, each selector switch being connected to control, alternately, said extend and retract solenoids of said main control valve and to control one control solenoid of one cylinder control valve;

each selector switch being operable to effect, alternately, extension or retraction of its associated cylinder, and predetermined combinations of selector swtiches being operable simultaneously to effect, alternately, extension or retraction of extend cylinders of said machine and to effect, alternately, extension or retraction of vertical stabilizer cylinders on said machine.

10. A machine according to claim 9 including a plurality of holding valves, each holding valve being connected to a vertical stabilizer cylinder to prevent drift thereof.

11. A machine according to claim 10 wherein each of said holding valves comprises first and second check valves located in the fluid lines to the extend chamber and the retract chamber, respectively, of a vertical stabilizer cylinder, and check valves being poled to prevent fluid flow from said chambers, and each check valve being connected by a pilot pressure line to the fluid line in which the other check valve is located, whereby each check valve opens to permit fluid flow from its associated cylinder chamber in response to pressurized fluid being supplied to the other chamber.

* * * * *